United States Patent Office 3,176,461
Patented Apr. 6, 1965

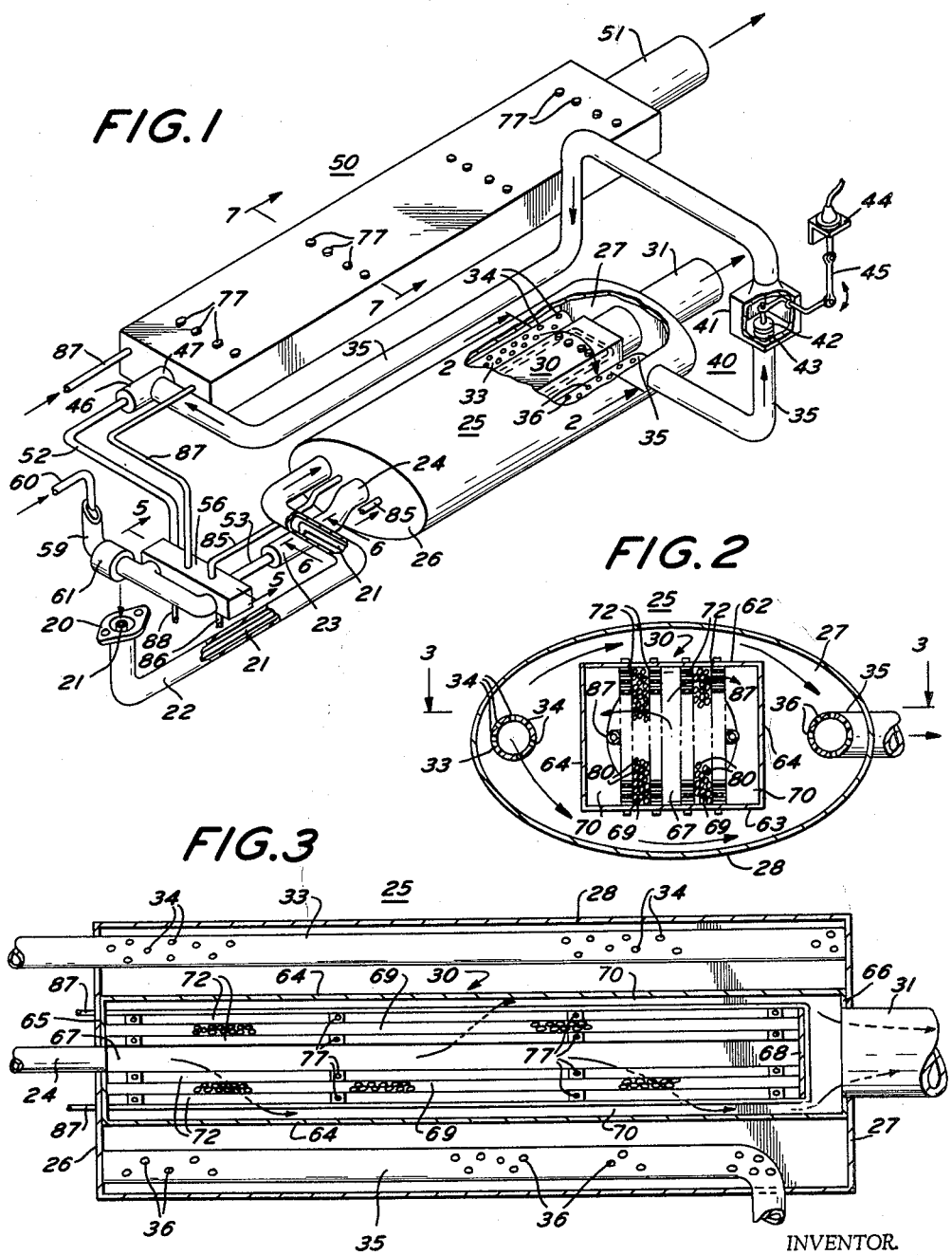

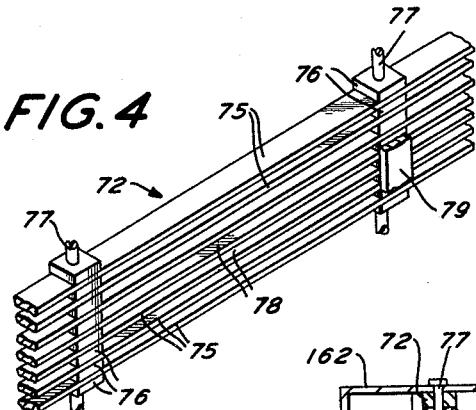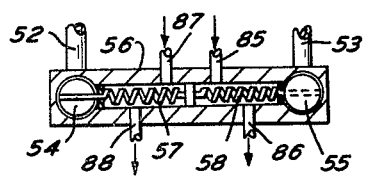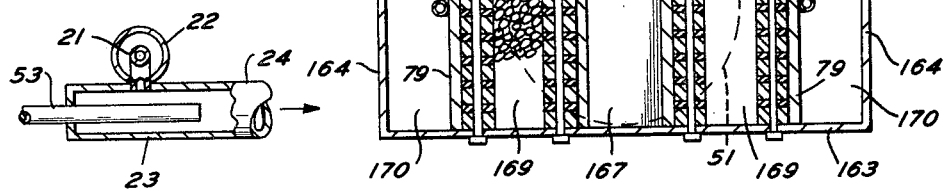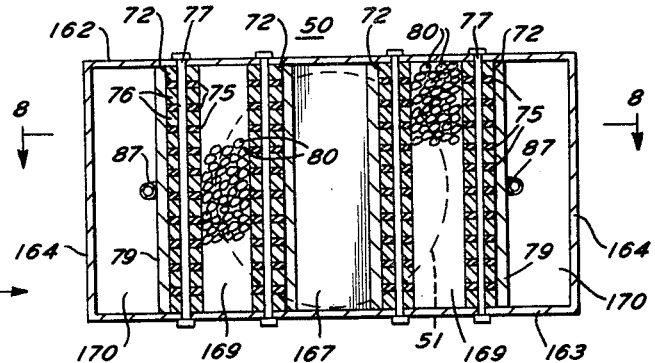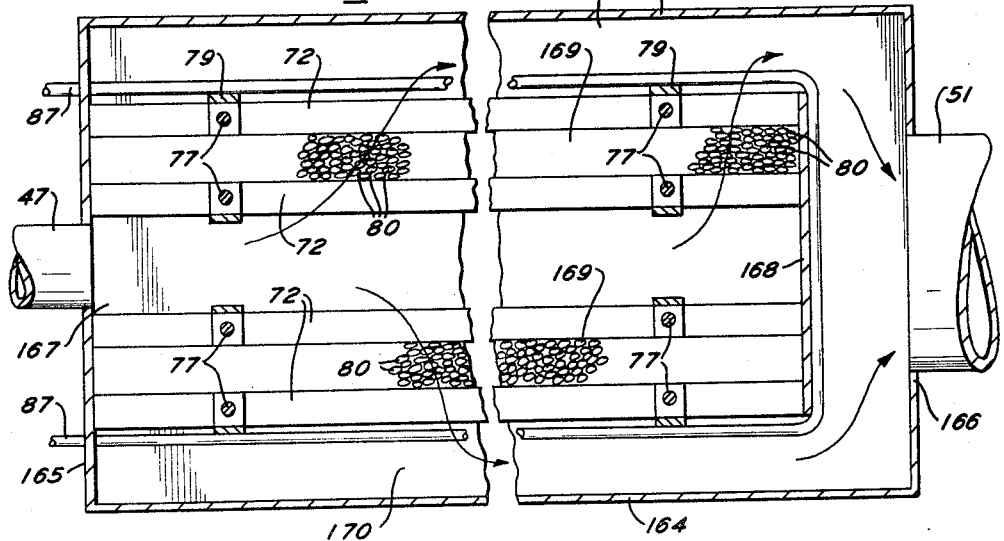

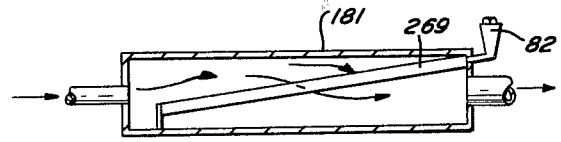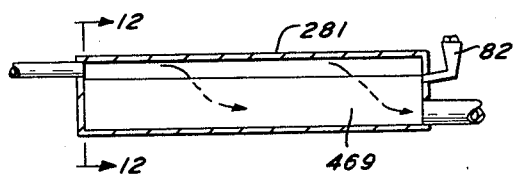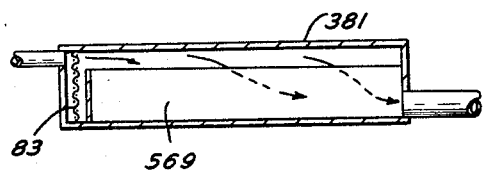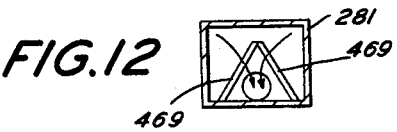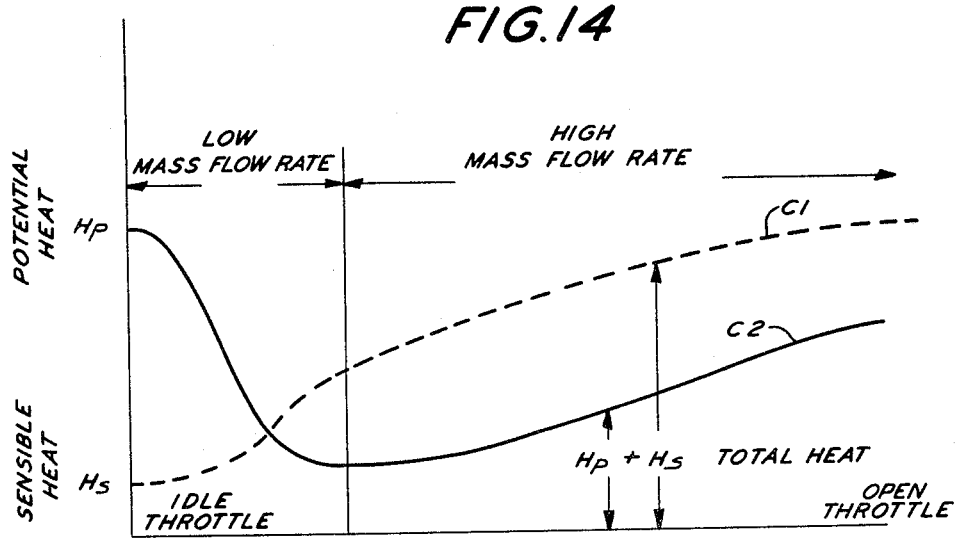

3,176,461
INTERNAL COMBUSTION ENGINE EXHAUST
GAS CONVERTERS
Willard R. Calvert, 306 Glenloch Road, Ridley Park, Pa.
Filed Oct. 1, 1963, Ser. No. 313,062
14 Claims. (Cl. 60—30)

This invention relates to a converter for the exhaust of internal combustion engines which employ gasoline, including leaded gasoline. It also relates to gas engines which employ natural gas or liquified petroleum gases and to certain four cycle diesel engines.

More particularly the present invention relates to improved methods and apparatus for effecting essentially complete conversion of gases prior to discharge to the atmosphere. By such conversion harmful constituents, such as carbon-monoxide, smog forming hydrocarbons and other hydrocarbons, and some nitrogen oxides, are converted to harmless compounds.

Various systems have heretofore been proposed for the treatment of exhaust gases from such engines but these had various shortcomings and did not accommodate both the deleterious effects and the benefits of heat loss from the walls of the metal apparatus, nor did they provide adequate sonic muffling, nor were they adequate in completing the conversion under exhaust quality conditions of high-heat level wherein a considerable amount of cooling is required to prevent self-destruction from the heat released.

It is the principal object of the present invention to provide improved methods and apparatus for the conversion of exhaust gases in which the gases are handled in an improved manner from the engine through the final conversion.

It is a further object of the present invention to provide for the conversion of exhaust gases from internal combustion engines in an improved fashion by avoiding the deleterious effects of heat loss from the metal walls when it is advantageous to do so and by utilizing the benefits of heat loss from the metal walls when it is advantageous to do so.

It is a further object of the present invention to provide improved methods and apparatus for the catalytic conversion of exhaust gases from engines which power moving vehicles and which during use thereof are subjected to the effects of wind, rain, slush, snow, dust, dirt and other hazards of the road and in which the catalyst is used to the best advantage.

It is a further object of the present invention to provide improved apparatus of all metal construction to convey the exhaust gases to and from the conversion locations and to contain the catalyst to the best advantage under the conditions necessary to maintain the catalytic reaction and under the conditions resulting therefrom.

It is a further object of the present invention to provide improved apparatus which will muffle the sonic vibrations while at the same time will provide air admixture with the exhaust gases and will be adequate for the major cooling required at the exhaust quality conditions of highest heat level and by means of low cost venturi inspirators.

It is a further object of the present invention to provide a converter comprised of two separate catalytic systems, one of which accommodates the exhaust gases when the heat loss through the gas conduit walls and through the catalyst container walls is detrimental to the catalytic reaction, and the other of which benefits from the heat loss through its walls when the catalytic reaction of the exhaust gases releases so much heat that heat loss through walls is beneficial.

It is a further object of the present invention to provide air in admixture with exhaust gas to separate catalytic systems in accordance with the stoichiometric reaction requirements and for dilution for cooling requirements existing in each system and self adjusting or control means for the air.

It is a further object of the present invention to provide a simple but effective combination of separate catalytic systems with some parts in the combination serving multiple functions and serving to utilize the apparatus and catalyst in both systems to the best advantage functionally as well as in respect to size, weight and cost.

It is a further object of the present invention to provide fast response catalytic conversion by utilizing a small mass of catalyst and apparatus when the exhaust gas mass flow rate is small and thereby speeding up the equilibration of the catalytic combustion phenomena and by utilizing this small mass at the same time with a larger mass of catalyst and apparatus when the exhaust gas mass-flow rate is large, thereby keeping the small mass of catalyst reactive at all times and the larger mass of catalyst reactive only during the normally fast responsive periods when the exhaust gas mass-flow rate is large and hot.

Other objects and advantageous features of the invention will be apparent from the description and claims.

The nature and characteristic features of the invention will be more readily understood from the following description taken in connection with the accompanying drawings forming part thereof, in which:

FIGURE 1 is a view in perspective of converter apparatus in accordance with the invention;

FIG. 2 is a vertical sectional view, enlarged, taken approximately on the line 2—2 of FIG. 1;

FIG. 3 is a horizontal sectional view taken approximately on the line 3—3 of FIG. 2;

FIG. 4 is a fragmentary perspective view illustrating a preferred wall construction for the catalyst chambers;

FIG. 5 is a vertical sectional view, enlarged, taken approximately on the line 5—5 of FIG. 1;

FIG. 6 is a vertical sectional view, enlarged, taken approximately on the line 6—6 of FIG. 1;

FIG. 7 is a vertical sectional view, enlarged, taken approximately on the line 7—7 of FIG. 1;

FIG. 8 is a horizontal sectional view taken approximately on the line 8—8 of FIG. 7;

FIGS. 9, 10 and 11 are longitudinal vertical sectional views illustrating in simplified form other catalyst bed arrangements;

FIG. 12 is a vertical transverse sectional view taken approximately on the line 12—12 of FIG. 11;

FIG. 13 is a longitudinal vertical sectional view illustrating in simplified form still another catalyst bed; and FIG. 14 is a chart showing the relation of sensible heat content and potential heat content throughout the range of throttle opening from idle to full throttle.

It should, of course, be understood that the description and drawings herein are illustrative merely and that various modifications and changes can be made in the structure and methods disclosed without departing from the spirit of the invention.

Like numerals refer to like parts throughout the several views.

Referring now to FIGS. 1 to 8 of the drawings, an engine exhaust manifold connection 20 is shown, separated from the engine (not shown) the exhaust gases of which are to be converted. The manifold connection 20 has extending therefrom an inner exhaust gas conduit 21 for conveying the gases at low gas flow and is concentric with an outer bare wall gas conduit 22 of greater cross sectional area for conveying additional gases for high gas flow.

The inner conduit 21 extends to a venturi 23 for air admixture with gases delivered by the conduit 21. The venturi 23 has a gas conduit 24 extending therefrom to a sonic muffler case 25.

The sonic muffler case 25 has end walls 26 and 27 and a generally oval or elliptical wall 28 therebetween. Within the interior of the muffler case 25 a small enclosed catalytic unit 30 is provided to which the gas conduit 24 extends, through the end wall 26, and from which an exhaust discharge or tail pipe 31 for converted gases extends through the end wall 27.

The outer conduit 22, from which the inner conduit 21 has been separated, extends through the end wall 26 of the sonic muffler case 25 and has an interiorly extending portion 33 along one side of the case 25 with a plurality of perforations 34 for gas delivery into the interior of the case 25.

The sonic muffler case 25 has a pipe 35 extending thereinto, along the opposite side from the pipe 33 with perforations 36 for entrance of gas of lesser sonic vibrations from the interior of the case 25. The pipe 35 extends from the case 25 to a valve 40.

The valve 40 has a housing 41 with a valve plug 42 therein for self centering engagement with or separation from a valve seat 43. The valve plug 42 preferably positioned either in full open or in closed position, does not throttle the gas flow through the pipe 35.

In order to control the positioning of the valve plug 42, a vacuum diaphragm switch 44 can be employed responsive to the vacuum in the intake manifold (not shown) of the engine, and connected by an operating linkage 45 to the valve plug 42. When this intake manifold vacuum is high, the exhaust gas mass-flow-rate is low and the switch 44 keeps this valve plug 42 in closed position. When the vacuum decreases to a predetermined value, dependent upon the particular installation, the switch 44 causes the valve plug 42 to be moved to open position and to be held open. The bare pipe 35 can thus convey the high mass-flow-rate gases from the bare wall conduit and chamber preceding to the bare wall system.

The pipe 35 extends to a venturi 46 for admixture of gases conveyed thereby with air. The venturi 46 is connected by a pipe 47 to a large catalytic unit 50 which has an exhaust gas or tail pipe 51 extending therefrom for discharge of gases converted in the unit 50.

The air inspirated by the venturis 23 and 46 is delivered thereto through pipes 52 and 53 and is measured to at least some extent by butterfly valves 54 and 55 in a valve housing 56. The valves 54 and 55 are preferably controlled by thermal sensors 57 and 58 in the housing 56. The valve housing 56 has an air entrance tube 57 with branches connected thereto, the tube 57 having an elevated inlet 59 to avoid road water splash. The inlet 59 can have a connection 60 extending thereto from the crank case (not shown) of the engine for delivery of engine crank case blow-by gas. An air filter 61 can be provided in the tube 27 to prevent the entrance of dust and grit.

The catalytic unit 30, is shown in FIGS. 2, 3 and 4 and includes top and bottom walls 62 and 63 with side walls 64 and end walls 65 and 66 extending therebetween to provide a unit which is closed except for the conduit 24 and the conduit 31. The catalytic unit 30 also includes an inlet passageway 67 bounded by the top and bottom walls 62 and 63 by an inner end wall 68 parallel to the end wall 66, a catalyst bed 69 in columns of uniform thickness on each side thereof similarly bounded, and outlet passageways 70 communicating with the conduit 31.

The beds 69 are bounded on each side and separated from the inlet passageway 67 and outlet passageways 70 by perforate walls 72 which may be constructed as shown in FIG. 4. The walls 72 are preferably comprised of a stack of major formed elongated plates or plate-like strips 75 of metal which have been rolled or stamped and are thinner than minor spacer sections 76. Aligning pins 77 extend through the plates 75 and spacer sections 76. The thin major sections provide slots 78 when the minor sections are aligned adjacent to one another in stacks. A vertical brace member 79 fastened to the top and bottom walls 62 and 63 can be added to give additional support to the stack of plate-like strips 75.

The catalytic unit 50 shown in FIGS. 7 and 8 is preferably similar in construction to the catalytic unit 30 but of larger capacity to accommodate the larger mass flow of gas.

The unit 50 has top and bottom walls 162 and 163, side walls 164, and end walls 165 and 166, with an inlet passageway 167, catalyst beds 169 and outlet passageways 170. The beds 169 are bounded on each side by perforate walls 72 as before.

The catalyst beds 69 and 169 are preferably filled with pellets 80 of the catalyst.

The catalyst must be of a material resistant to excessive attrition and fracture during mechanical shock and thermal shock. Capable of satisfying these needs, there are certain formed alumina spheres and pellets as supports for a catalyst, which may be a combination of copper and chromium resulting from impregnation, drying and decomposition using a solution of metal salt. These are described in previous patents such as U.S. Patent No. 3,053,773.

In FIG. 9, another catalyst bed arrangement is shown within a housing 81 and with a horizontal bed 269 therein for passage of gases therethrough for conversion.

In FIG. 10, another catalyst bed arrangement is shown in a housing 181 with an inclined bed 369 for passage of gases for conversion and with a supply hopper 82 for continuous delivery of catalyst pellets 80.

In FIGS. 11 and 12, inclined catalyst beds 469 are shown at the bottom of a housing 281 and with a supply hopper 82 as before.

In FIG. 13, vertical converging wedge catalyst beds 569 are shown in a housing 381, and with an inlet screen 83 for preventing flow of solid particles into the bed 569.

The sensors 57 and 58 in the valve housing 56 are controlled respectively by the temperature conditions prevailing respectively in the catalytic units 30 and 50. A pipe 85 connected to the cooling system of the engine supplies water for sensing the temperature in the unit 30 which is directed therein along the wall 64, the wall 68, the other wall 64 and thence to the housing 56 where its temperature is effective at the sensor 58. This fluid is then returned by the pipe 86.

A pipe 87 also connected to the cooling system of the engine supplies water for sensing the temperature in the unit 50 which is directed therein along one wall 164, the rear wall 168, the other wall 164 and thence to the housing 56 where its temperature is effective at the sensor 57. This fluid is then returned by the pipe 88.

The mode of operation will now be pointed out reference first being had to FIG. 14.

In FIG. 14, throttle opening for one particular type of engine is represented on a logarithmic scale as abscissas with ordinates representing heat content, the variable nature of the exhaust gases can be illustrated by the curves which are examples of exhaust gas characteristics throughout the range of engine operation from close throttle (idle) to wide open throttle. The sensible heat $H_s$ of the gases reaching a simple sonic muffler through bare metal walls is illustrated by the broken line C1. The amount of wall surface and a variety of cooling effects such as water splash, wind and others, can displace this curve C1 upward or downward, but in general it climbs to high level as the mass-flow-rate of gases approaches its maximum. The potential heat $H_p$ illustrated by the solid line C2 is high at idle because of poor combustion efficiency. This decreases to a minimum through a period of operating conditions wherein combustion efficiency is very good and then climbs again according to the design characteristics and adjustment of the carburetor employed. From car to car this curve might be displaced upward or downward or even be of different shape according to the carburetor performance.

For low mass flow rate at the manifold connection 20, the valve plug 42 is seated, preventing flow through the conduit 22. The low mass flow is through the conduit 21, which is insulated by the space therearound in the conduit 22, to the venturi 23 where air is admixed therewith, controlled by the valve 55, and the gas-air mixture passes through the pipe 24 to the inlet passageway 67, divides and passes through the slots 78 in the walls 72 and into contact with the catalyst pellets 80 in the catalyst beds 69, with conversion, and thence through walls 72 to the outlet passageways 70 for discharge through the tail pipe 31.

If mass flow rate sensed by the diaphragm switch 44 is sufficient to effect separation of the valve plug 42 from its seat 43 engine exhaust gas also passes through the bare conduit 22, through the pipe portion 33 and the perforations 34, across the interior of the sonic muffler case 25, through the perforations 36 and the pipe 35, the valve housing 41 and the venturi 46. At the venturi 46 air is added to the exhaust gas in controlled amounts, controlled by the valve 54, and the gas-air mixture passes to the catalytic unit 50.

The gas-air mixture entering the inlet passageway 167 divides and passes through the slots 78 in the walls 72 and into contact with the catalyst pellets 80 in the catalyst beds 169, with conversion, and thence through walls 72 to the outlet passageways 170 for discharge through the tail pipe 51.

The maintaining of the catalytic reaction in the catalytic unit 30 at idle is not difficult in an adequately insulated system with some benefit from the total heat after complete conversion giving support to a low sensible heat content. The insulating effect of the closed gas space between the concentric conduits 21 and 22 from the manifold connection 20, the catalytic unit 30, and within the enclosure 35 surrounding this catalytic unit 30 will conserve the sensible heat content of the gases at low mass-flow-rate assuring maintaining of the catalytic reaction. The conserved sensible heat will hasten the heating up of the conduit 24, catalyst and catalytic unit 30 when starting from a cold start. Since this catalytic system apparatus is of low mass itself and is insulated, the low mass-flow rate gas becomes capable of starting reaction in a short time at engine operating conditions comparable to start-stop and go driving in a 15 or 25 mile per hour speed limit zone.

This has been a shortcoming of previous exhaust gas convertors which are dependent upon the hot, high sensible heat gases from the higher mass-flow-rate of exhaust gases comparable to speeds of greater than 40 miles per hour. Even with such hot gases these catalytic convertors required longer time to start from cold start and this became worse as the catalyst became less active from effects such as the lead additive contamination of the catalyst.

This catalytic convertor system, including the enclosed and encased unit 30, will benefit from any hotter gases passing through it or around it when the high mass-flow-rate valve 40 is open, but it is not dependent upon these hotter gases if the vacuum switch 44 has been set at the right vacuum point for switching.

The cross over point of the two curves C1 and C2 which is always lower when a bare wall conduit system is subjected to high out-side air flow rates such as exist when a car is moving rather than standing still has been one of the causes of catalytic reaction dying out in previous convertors not adequately insulated. This crossover is the point where total heat content is lowest and with sensible heat dangerously low, the reaction dies out. With sensible heat conserved as in the present invention, such sensible heat at this mass-flow-rate will adequately support the catalytic reaction even though the potential heat content might approach zero at times.

The high mass-flow-rate gases pass through a bare-wall system so that a large amount of cooling will be achieved. Dependence upon air dilution for all of the cooling would result in the use of a catalytic converter of unreasonable size and weight to handle the total admixture of gases at maximum flow-rate.

Throttle position is held steady only during the cruise operation of a moving vehicle and at idle. It is being moved between open and closed positions during stop and go driving. The pattern of movements on any one trip will be different from the pattern of movements on any other trip. Even on a test course laid out precisely, the pattern of a trip by any one driver will be significantly different from another trip by the same driver.

The exhaust gas from a moving vehicle engine will, at any one throttle setting, be different according to road conditions. The carburetion and ignition of an engine change with time, requiring a tune-up at times.

Engines are quite capable of satisfactory performance even though they are malfunctioning to some degree. Some drivers will wait for very serious malfunctioning before seeking a tune up.

A catalytic converter will be expected to function at all times with no extra bother or delays for the driver. It must therefore be capable of slef-adjustment to convert exhaust of any quality or quantity which will exist and be capable of re-adjustment as fast as the exhaust can change.

In order that the units 30 and 50 will perform as required, the gases entering the catalyst beds 69 and 169 must be at temperatures between 450° F. and 850° F. at all times. Release of a high potential heat by the catalyst will help maintain reaction when entering gas is at 450° F. A low potential heat release is likely to require that entering gases be closer to 850° F. The vacuum of the intake manifold which activates the switch 44 will be selected so that this condition is satisfied.

In order also that the units 30 and 50 will perform as required through long periods of car operation such as one year or more, then the influences upon the catalytic units 30 and 50 by various inorganic accumulations, such as road dust, and lead contamination if leaded gasoline is used, must be minimized. This can be done by employing a large catalyst face area, a large catalyst geometric surface area and a catalyst column thickness or bed depth as thin as feasible, preferably capable of some movement for self-cleaning action since it is not desirable to have the catalyst plugged with inorganic or carbonaceous accumulation. Data for these are as follows:

The face area of the small catalytic unit 30 can be between 50 and 200 square inches as required by the quality and quantity of the exhaust approaching it while this enclosed unit 30 is in use alone. Very small engines or very large engines might require less or more face area in this low mass-flow-rate system catalytic unit 30. The large catalytic unit 50 should provide additional face area so that the two catalytic units will provide a total of between 0.5 and 2.0 square inches per gram per minute of gasoline consumed at the maximum rate of gasoline consumed by the engine.

The geometric surface of the pellets 80 is a function of face area, of pellet diameter, and of bed depth. The large amount of geometric surface must be sufficient so that the highest potential heat release rate (in B.t.u. per minute per square inch) will not melt or fuse inorganic contaminants into the catalyst. For this purpose a column thickness or bed depth of between 1.0 to 2.5 inches of catalyst spheres or pellets of between .040 to .060 inch diameter will provide a desired geometric surface of between 50 and 150 square inches per square inch of face area.

In order that the converters 30 and 50 will perform as required the perforate walls 72 and the other metal support members of the catalytic units 30 and 50 must be capable of surviving the mechanical shock and thermal shock to which they will be subjected. The thermal shock will be the most severe since metal temperatures may change from a high temperature such as 1500° F. to a low temperature such as 100° F. in a period of time of a few seconds on occasions. More frequently changes in the range between about 850° F. and 1350° F. should occur in the convertors 30 and 50 of the present invention.

In addition the perforate walls 72 must serve to distribute the gases uniformly to the catalyst bed face area without becoming plugged through time by the inorganic materials which might accumulate. For this reason some flexing or movement at the slots 78 in the perforate wall 72 is preferred while it is serving to contain the catalyst.

In order that the converters 30 and 50 will perform as required the air intake system must be capable of supplying air adequate for cooling the stream at the conditions of maximum total heat content after liberation of all or a major part of the potential heat by the catalytic reaction. A blower or pump with capacity enough to supply from 2 to 3 weights of air diluting each weight of exhaust gases would be a large one. Venturis, such as the venturis 23 and 46 can accomplish this for the catalytic units 30 and 50 heretofore described if the effluent tail pipes 31 and 51 are of cross sectional area at least three times the cross sectional area of the exhaust gas conduits 21 and 22. A theoretical stoichiometric mixture of fuel and air could heat the catalyst to flame temperature of about 4000° F. which would be self-destructive if not previously diluted with the three weights of air. Since dilution with three weights of air is likely to quench the catalytic reaction at low total heat levels, a means must be provided to adjust the air flow according to the needs of the one and/or of the other of the catalytic units 30 and 50. The thermal elements, such as the pipes 85 and 87 are located within the catalytic units 30 and 50 adjacent to the outlet perforate wall 72 of the catalyst beds 69 and 169. Water within these pipes 85 and 87 is heated or cooled by the catalyst and effluent stream of gases and in turn heats or cools the sensors 57 and 58 which will twist to open or to close butterfly vane type air valves 54 and 55 proportionally with the change of temperature of the catalyst and effluent gases.

In order that the converter will perform as required and have the desired amount of sonic muffling, the higher mass-flow-rate gases pass through the sonic chamber 25 and emerge therefrom through a conduit 35 of essentially the same cross-sectional area as the inlet conduit 22. The present invention includes this feature with the subsequent passage of muffled gases into an air admixing device, such as the venturi inspirator 46, which in turn requires that the gas passageways beyond the venturi throat be of greater open area, including the perforate walls 72, catalyst beds 169 and tail-pipe 51, sufficient to permit inspiration of as much as the required two to three weights of air for diluting the exhaust gases and result in a cooled effluent.

Additional sonic muffling of the low mass-flow-rate gases can be provided, when the catalytic unit 30 is inadequate in this function, by "tuning" the air intake pipe 59 and filter chamber 61 and/or by adding an enclosed sonic muffler (not shown) in the concentric pipe 21 between the manifold connection 20 and venturi 23.

For low-mass-flow, the sensible heat is low because of the cooling effect between the engine and the muffler casing 25. Protection against heat losses is necessary to maintain the gases at a temperature level where the catalytic reaction is best, i.e. 650° F. to 850° F. The potential heat content is quite high at the lowest throttle position and engine rpm. As the engine accelerates the potential heat falls to a minimum level. The crossover on FIG. 14 represents the most difficult situation. The total heat may fall below the required minimum for catalytic reaction. This situation disappears if the cross over level is moved upward. Elimination of excessive heat loss is the safest remedy. The catalyst container wall loss is highly critical at low flow rates and with low $\Delta H_p$. From a cold start the mass flow rate relationship to catalyst and case mass is very critical.

For high mass flow the sensible heat is high and cooling is required at high rates. The mass dilution ratio or dilution to cool is dependent upon $\Sigma(\Delta H_s + \Delta H_p)$ which varies with the type of carburetion as well as with adjustment and usual use, changes with any one type carburetion, and varies with the amount of bare wall cooling which is used. The potential heat increases with loading, power jet cut in, etc., so that cooling by dilution adjustment should be rapid. The catalyst container wall loss is not critical, with some advantage in high loss rate. From a cold start the mass flow rate relationship to catalyst and case mass is not critical.

I claim:

1. An exhaust gas converter for internal combustion engines comprising an exhaust gas manifold connection having a first gas conduit for low mass gas flow and a second bare gas conduit for high mass gas flow, a valve in said second gas conduit, a control member for said valve, a sonic muffler having an interior space with a separately enclosed catalytic unit therein, said first gas conduit extending to and from said enclosed catalytic unit for delivery of gas therethrough, said second gas conduit being connected to said sonic muffler interior space exteriorly of said enclosed catalytic unit, a high mass flow catalytic unit, and a fluid delivery conduit extending from said space to said high mass flow catalytic unit for delivery of gas thereto.

2. An exhaust gas converter as defined in claim 1 in which first gas conduit is interiorly disposed within said second gase conduit.

3. An exhaust gas converter as defined in claim 1 in which said first gas conduit is interiorly disposed within said second gas conduit, the space within said second gas conduit inhibiting heat loss from said first gas conduit when said valve is closed.

4. An exhaust gas converter as defined in claim 1 in which the interior space in said sonic muffler, provides an insulating space for reducing heat transfer outwardly from said enclosed catalytic unit.

5. An exhaust gas converter as defined in claim 1 in which said valve determines the flow of high mass gas through said second gas conduit.

6. An exhaust gas converter as defined in claim 1 in which at least one of said gas conduits has a venturi air inspirator connected thereto for delivery of air with exhaust gas to at least one of said catalytic units.

7. An exhaust gas converter as defined in claim 6 in which a temperature responsive device is provided in a catalytic unit for controlling the air delivery thereto.

8. An exhaust gas converter as defined in claim 1 in which said first gas conduit has a venturi air inspirator for delivery of air with exhaust gas to said enclosed catalytic unit.

9. An exhaust gas converter as defined in claim 8 having means responsive to the temperature at said enclosed catalytic unit for controlling the air delivery to said venturi.

10. An exhaust gas converter as defined in claim 1 in which said second gas conduit has a venturi air inspirator for delivery of air with exhaust gas to said high mass flow catalytic unit.

11. An exhaust gas converter as defined in claim 10 having means responsive to the temperature at said catalytic unit for controlling the air delivery to said unit.

12. An exhaust gas converter as defined in claim 1 in which said control member is responsive to the mass gas flow of exhaust gas.

13. An exhaust gas converter as defined in claim 1 in which said control member is responsive to the intake manifold pressure of the engine.

14. An exhaust gas converter as defined in claim 1 in which the first gas conduit in advance of the enclosed catalytic unit is concentrically disposed within said second gas conduit.

References Cited by the Examiner

UNITED STATES PATENTS

| Re. 25,576 | 5/64 | Cornelius | 60—30 |
| 2,991,160 | 7/61 | Claussen | 60—30 |
| 3,086,353 | 4/63 | Ridgway | 60—29 |
| 3,090,677 | 5/63 | Scheitlin et al. | 60—29 |

RICHARD B. WILKINSON, *Primary Examiner.*